Nov. 15, 1938.  C. G. OLSON  2,136,458
TAPPING SCREW
Filed April 16, 1935  3 Sheets-Sheet 1

Inventor
Carl G. Olson
By: Cox & Moore attys.

Nov. 15, 1938.  C. G. OLSON  2,136,458
TAPPING SCREW
Filed April 16, 1935   3 Sheets-Sheet 3

Inventor:
Carl G. Olson
By: Cox & Moore attys.

Patented Nov. 15, 1938

2,136,458

UNITED STATES PATENT OFFICE 2,136,458

TAPPING SCREW

Carl G. Olson, Chicago, Ill., assignor to Illinois Tool Works, Chicago, Ill., a corporation of Illinois Application April 16, 1935, Serial No. 16,633

16 Claims. (Cl. 85—47)

This invention relates generally to methods of and apparatus for cutting threads, and more particularly to methods of and tapping fasteners for cutting threads in relatively hard materials, such as cast iron, steel, Bakelite and the like.

It is one of the important objects of the present invention to provide a device which will cut a thread by removing material from the work and quickly ejecting said material so as to positively prevent clogging or jamming. Experience has shown that difficulty in the removal of material cut away to form a thread has been occasioned in using conventional thread cutting devices. In other words, unless the material which is cut out of the work to form the thread is ejected from the vicinity of the cutting edge as rapidly as it is cut away, said material will jam or clog the area in advance of the cutting edge and thus seriously impair the operating effectiveness thereof. Even in the use of many conventional taps it is found necessary to partially turn the tap into the work and then impart a slight retrograde movement thereto in order to prevent clogging. Conventional taps and other thread cutting devices with which I am familiar are so designed as to cause relatively fine or comminuted material to be cut away through the action of the cutting edge. These finely divided particles exert a strong tendency to accumulate and thus form an obstacle at the advancing side of the cutting edge, thereby preventing the cutting device from being continuously turned into the work to form the thread.

More specifically, my invention contemplates a cutting device or a tapping fastener which is so constructed as to enable the cutting edge thereof to form strip or ribbonlike chips or shavings of substantial size, as distinguished from the finely divided cut-away particles mentioned above, said ribbonlike cut-away material removing itself from the vicinity of the cutting edge as quickly as said cutting edge is capable of producing it. In other words, my invention contemplates a thread cutting device or fastener wherein the cut-away stock is properly directed to the entering extremity away from the cutting edge.

Still more specifically, my invention contemplates a thread cutting device or fastener, as mentioned above, wherein a passageway of sufficient size to accommodate cut-away material is provided, said passageway having in association therewith a material directing surface especially designed to be impinged by the cut-away material and to positively direct said material laterally and axially away from the cutting edge.

Another object of my invention is to provide a threaded cutting device or fastener adapted to tap its way into a relatively hard work piece, and being constructed and arranged to exert a pressure upon the material of the work piece in a manner so as to render the cutting edge thereof more efficient in removing material from the work piece. To this end I propose to provide the threaded body of the cutting device or fastener with a recess, into which material of the work piece compressed during the rotation of the device therein is adapted to expand and thereby render the cutting edge more aggressive in removing stock.

It is a further object of my invention to provide, in combination with a cutting device or fastener of the type just mentioned, a deflecting surface for receiving and effectively guiding material cut out of the work piece so as to positively prevent accumulation of cut-away material in advance of the cutting edge.

Still another object of my invention is to provide a cutting device or fastener, as above set forth, in which the root diameter of at least a portion of the thread remains constant, the thread portion toward the entering end thereof diminishing in diameter to facilitate the initial entrance within an unthreaded aperture of the work piece.

The foregoing and numerous other objects and advantages will be more apparent from the following detailed description when considered in connection with the accompanying drawings, wherein—

Figures 10 and 11 diagrammatically illustrate the comparison in principle of operation of the cutting edges of my improved tapping device with cutting edges employed in conventional tapping devices.

Referring now to the drawings more in detail wherein like numerals have been employed to designate similar parts throughout the various figures, it will be seen that one embodiment of my invention, which I have designated generally by the numeral 20 (Figure 1) includes a cutting device or tapping screw fastener having a screw body 22 formed integral at one extremity thereof with a suitable head 24 adapted to be gripped for imparting rotation to the screw body 22. The head 24, as disclosed herein, is of the conventional hexagonal type, but obviously the invention contemplates various modifications adapted to be gripped by a turning tool. I prefer to designate a section 26 of the screw body 22, and indicated by the bracket in Figure 1, as the holding portion inasmuch as this is the portion in which the thread 28 is of maximum or constant diameter, and namely, the portion which finally holds the screw within the work. A section 30 of the screw I prefer to designate as the entering or tapping section because this is the portion which enters and cuts the thread within the work piece. While the root diameter of the thread 28 throughout the extent of the screw body 22 is constant, the thread convolutions included within the section 30 decrease in external diameter, as well as in height toward the entering end of the screw. Stating it another way, the core of the screw is constant in diameter, the section 26 of the screw having thread convolutions of constant maximum diameter and the thread convolutions of the section 30 diminishing in diameter toward the entering end.

Figures 1, 2, 3, 4, 5:
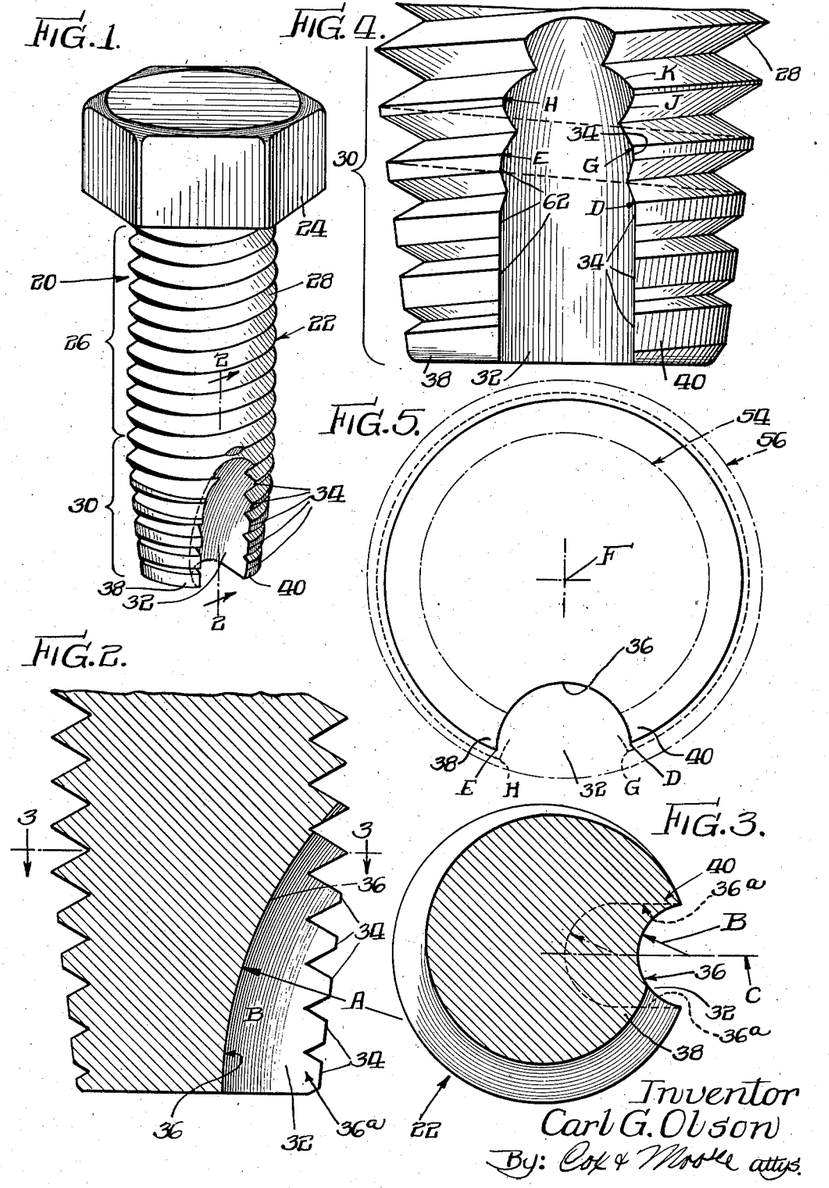
Figure 1 is a perspective view of a cutting device or tapping fastener which is representative of one embodiment of my invention.
Figure 2 is a fragmentary enlarged axial sectional view of the lower end of the screw shown in Figure 1, said view being taken substantially along the line 2—2 of Figure 1.
Figure 3 is a transverse sectional view taken substantially along the line 3—3 of Figure 2.
Figure 4 is an enlarged elevational view of the lower end of the screw of Figure 1 with the recess facing forwardly.
Figure 5 is a diagrammatic illustration of the manner in which the thread convolutions shown in Figure 4 function to compress the material of the work piece so as to increase the effectiveness and aggressiveness of the cutting edge.

A recess 32 is provided which serves to present a cutting section comprising a plurality of cutting edges 34 which decrease in axial width as they recede from the entering end. Particular attention is directed to the fact that the bottom of the recess 32 is arcuate when considered both in axial cross section, as shown in Figure 2, and transverse cross section, as viewed in Figure 3. In fact, the recess disclosed in Figures 1 to 4, inclusive, is provided with a bottom or work deflecting and guiding surface 36, which in axial and transverse cross section conforms with arcs of circles. The radius of the arc presented in axial or longitudinal cross section is indicated by the letter A in Figure 2, and the radius of the arc viewed in transverse cross section (Figure 3) is designated by the letter B. In Figure 3 the radial dot-and-dash line C indicates the points from which the transverse arcs, or, in other words, the radii B are struck. The manner in which the curved or arcuate surface 36 functions to direct and guide cut-away material of the work piece will be more apparent as the description progresses.

The recess 32 separates a portion of the lower section 30 of the screw into a pair of sections 38 and 40. The recess 32 is shallow enough to prevent the section 38 from yielding any appreciable amount toward the section 40 when the screw is tightened within a work piece. In other words, the sections 38 and 40 are substantially rigid sections. While the recess 32 is shallow enough to maintain the rigidity of the sections 38 and 40, it is wide enough to present a cross sectional area of sufficient size to accommodate the material as it is removed from the work, as will presently, more clearly appear.

Figure 12:
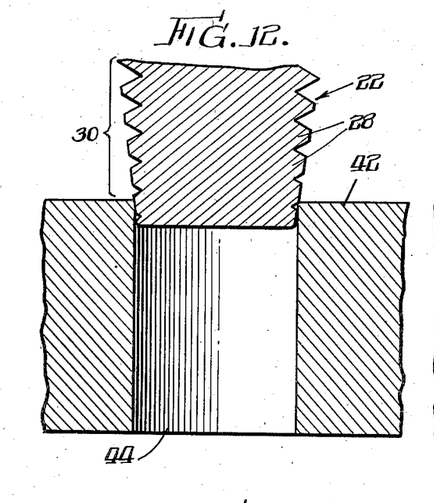
Figure 12 is a fragmentary axial sectional view of the screw and work piece disclosing the manner in which the screw is started within the unthreaded aperture of a work piece.

To facilitate the aggressive, initial entrance of the screw with a work piece 42 (see Figures 6, 8 and 12), I prefer to retain a portion of the thread 28 at the entering end of the screw. In other words, the thread 28 does not completely vanish at the entering end but retains at least a portion of its height. That is to say, the entering extremity of the screw is slightly greater in diameter than the root diameter thereof. This will be clearly apparent from the disclosures in Figure 4 and 12. In Figure 12 I have shown the screw initially inserted within an unthreaded aperture 44 of the work piece. It will be noted that the aperture 44 has a diameter slightly greater than the root diameter of the screw and permits the first thread convolution to pass freely into the aperture. However, the cutting edges 34 of the succeeding convolutions cause sections or ribbonlike strips 46, 48, 50 and 52 to be cut away from the work piece (see particularly Figures 6, 8 and 9).

As previously pointed out, it is one of the important objects of my present invention to provide a cutting device or tapping fastener which will enable substantial lengths or sections of material, as distinguished from finely divided particles thereof, to be removed during the cutting operation. In order to insure the formation of strips, as distinguished from small chips which have a tendency to crowd or jam, there must be sufficient stock presented at the advancing side of each of the cutting edges 34. Thus, unless these cutting edges can aggressively bite or dig into the stock, the substantial lengths or strips of material will not be formed during the cutting action. In using conventional taps, for example, it is common practice to relieve the peripheral portions of the thread convolutions receding from the cutting edges, and, while these taps do cut away material of the work in forming the threads therein, this cut-away material comprises relatively small particles or chips which have a strong tendency to accumulate within and clog the area in advance of the cutting edges. It will be noted that the tapping device disclosed herein is not provided with peripheral relief. Referring to Figure 4, attention is directed to the thread convolution which begins at the point D and continues in a counter-clockwise direction, as viewed from the top and terminates at the point E. The point E obviously is further removed radially from the axis of the screw than the point D. Thus, as the cutting edge 34 removes the strip material 48 from the work piece, the thread convolution extending from the point D to the point E follows within the thread which has been cut, and instead of the peripheral surface extending from the point D to the point E being relieved, as is the common practice in using conventional taps, said peripheral surface spirally digresses further away from the screw axis until it reaches its maximum point of digression at E. This may be more readily observed from the diagram in Figure 5. The inner dot-and-dash circle 54 designates the constant root diameter of the thread 28 and the outer dot-and-dash circle 56 represents the external diameter of the full thread on the holding section 26 of the screw. The recess 32 of the screw is shown within the solid line representing the bottom or deflecting surface 36, and the spiral solid line beginning at the point D and extending to the point E represents the convolution D—E just described in connection with Figure 4. It will be noted that the point E is radially disposed from the axis F of the screw a greater distance than the point D. Likewise, the next succeeding convolution extending between points G and H is indicated by the dotted line in Figure 5. Here again, the thread periphery gradually increases in distance from the screw axis F from the point G on the cutting edge to the point H on the trailing edge.

The compressive action of each convolution extending from the cutting edge to the trailing edge, as just described, functionally cooperates to increase the cutting effectiveness of the edges 34. That is to say, the material of the work piece subjected to compression as the result of the action of the thread convolutions, has a tendency to experience relief from said compression within the recess 32. It might be said that as the recess rotates within the work, material of the work under compression has a tendency to expand into the recess a sufficient amount to increase the cutting effectiveness of the edges 34. Although this expansion of material into the recess 32 may be very slight, it is amply sufficient to continuously present to the approaching cutting edge additional stock in the form of a dip or sag into the recess 32, for increasing the cutting aggressiveness of said approaching edge. This increase in aggressiveness enables a substantial shaving or strip of material to be removed from the stock and directed into association with the arcuate deflecting surface 32.

Figures 6, 7, 8, 9, 10, 11:
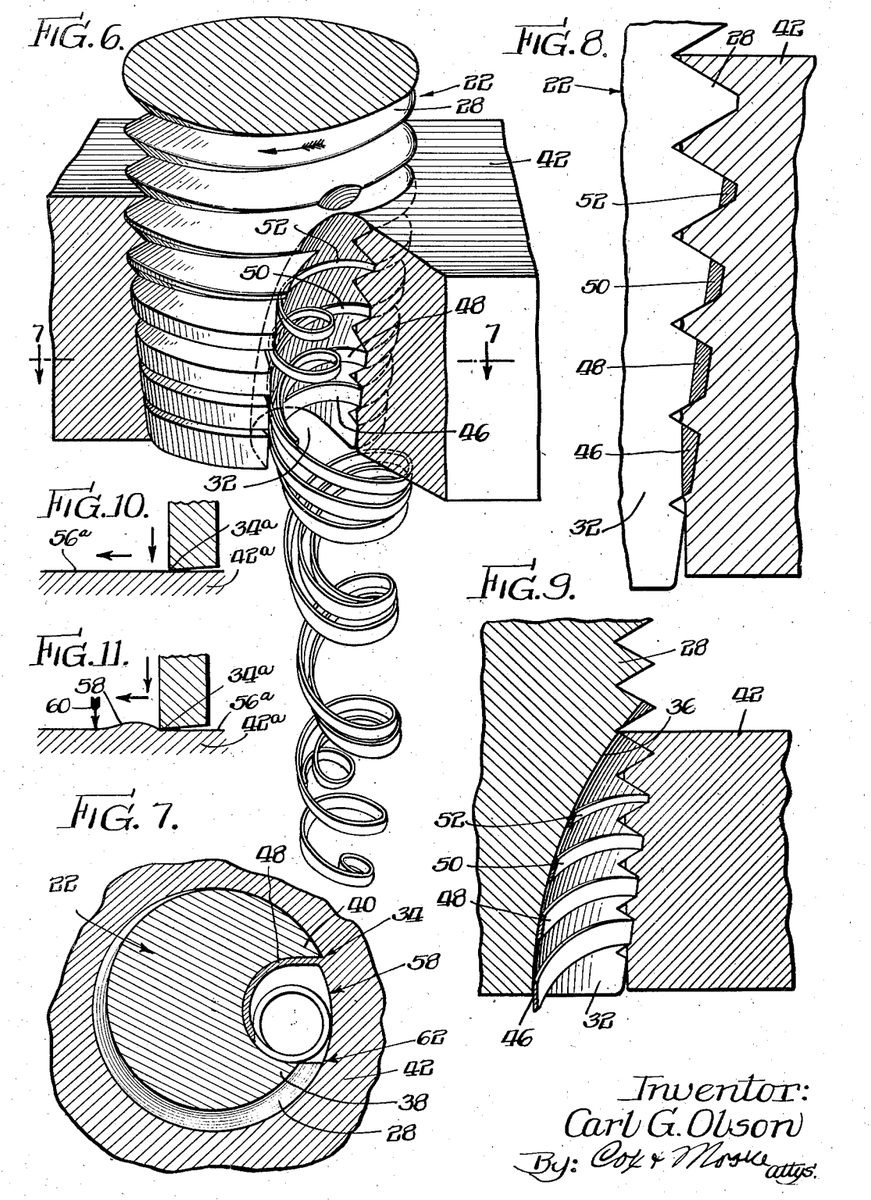
Figure 6 is a fragmentary perspective view of the lower end of the fastener disclosed in the previous figures in operative association with and partially inserted within the work piece, a portion of the forward side of the work piece being broken away to more clearly illustrate the manner in which the cut-away material is formed into ribbonlike elements or strips, and is directed laterally and axially of the screw in a manner to prevent clogging at the advancing side of the cutting edge.
Figure 7 is a transverse sectional view taken substantially along the line 7—7 of Figure 6 to more clearly illustrate the manner in which the deflecting or guiding surface in the fastener receives and properly guides the cut-away material or strip.
Figure 8 is a fragmentary enlarged axial sectional view of the screw and work piece in Figure 6 taken at the point where the cutting edge is actually in the process of cutting away the material of the work piece.
Figure 9 is a fragmentary view of the screw and work of Figure 6, the screw being centrally sectioned and only the portions of the removed work in the immediate vicinity of the cutting edge being shown to more clearly illustrate the manner in which the deflecting surface of the screw initially receives and guides the cut-away material.
Figure 10 disclosing a cutting edge being scraped along a smooth surface.
Figure 11 disclosing said cutting edge being urged along a surface provided with a slight rise.

In Figures 10 and 11 I have endeavored to diagrammatically illustrate a comparison in functional characteristics of a cutting edge which is urged along a plain surface and a cutting edge which is urged along a surface continuously presenting a slight rise in advance of the cutting edge. Figure 10 discloses a work piece 42a having a plain flat surface 56a which corresponds with the inner periphery of the aperture 44 previously described. A tool having a cutting edge 34a is subjected to pressures, as indicated by the directional arrows, one pressure urging the tool to the left and another acting downwardly against the surface 56a. A tool acting in this manner will have a tendency to scrape away material from the surface 56a in the form of relatively small shavings or chips. In Figure 11 I have shown the same elements, the only difference being that a slight rise or crest 58 is continuously presented in advance of the cutting edge 34a as a result of pressure applied at 60. It will be apparent that under such circumstances a continuous strip or shaving of substantial size will be removed, and the cutting action of the edge 34a will be rendered considerably more aggressive. Figure 11 diagrammatically illustrates the functioning of my improved tapping device in that it illustrates the manner in which material is caused to rise or expand in advance of the approaching cutting edge, said expansion taking place within the recess 32 due to the release of the compression in the work, which compression is established as a result of the radial digression of the periphery of each thread convolution as it recedes from the cutting edge to the trailing edge indicated by the numeral 62. The crest or rise, which I have indicated by the numeral 58 of Figure 11 is also indicated by the same numeral in Figure 7, which discloses the functioning of the screw in the work. It is only necessary to present a rise of a small fraction of an inch to maintain the continuous cutting action of the edges 34 in the manner just described.

In addition to the formation of the cut-away material into strips or ribbonlike elements, it is equally important to expeditiously remove said material from the recess 32. It will be noted from Figures 6, 7 and 9 that, as the strip material 46—52 emerges from the cutting edge, it immediately impinges the arcuate deflecting surface 36. The transverse arcuate form of the surface 36 causes the strips 46—52 to be curled into a coil, and the axial arcuate form of said surface simultaneously directs said coiled portions axially of the screw toward the end opening of the recess 32. That is to say, the wall or surface which defines the recess 32 is so disposed as to effect the lateral and axial guidance of the cut-away material so as to maintain the recess 32 free from the accumulation of chips. Should the removed strip material become broken or severed before it reaches the outlet of the recess 32, the succeeding or approaching strip material carries or forces the broken parts out of the recess. Thus, the strips 46—52 continuously move laterally and axially, thereby clearing the path for successive cut-away material. This action is to be clearly distinguished from the formation of finely divided or small chips, or even relatively large sections of stock which are not progressively and continuously urged axially of the screw to ultimately and positively effect the ejection thereof and the clearing of a path for successive material.

Attention is also directed to the fact that the bottom or deflecting surface 36 merges with oppositely disposed flat surfaces 36a at the entering end of the screw. These flat surfaces 36a are parallel with the screw axis and are tangent with the transverse curvature of the recess 32. As the surfaces 36a extend axially away from the entering end of the screw, they also merge or blend with the axial curvature of the bottom surface 36. In other words, the flat surfaces 36a blend or merge with the arcuate bottom surface 36. As viewed in Figure 2, the flat surfaces 36a occupy the area to the lower right of the curved surface 36.

As viewed in Figure 4, the oppositely disposed side walls or surfaces 36a extend axially from the entering end of the screw in substantial parallelism with the screw axis for a distance approximately equal to three thread convolutions. From this point the walls of the recess curve toward each other. This arrangement of the recess causes the cutting edges 34 on the first three thread convolutions to be acute, as will be seen from the solid lines in Figure 5. The next succeeding edges 34 become less acute, and, in fact, ultimately become obtuse, as will be apparent from the dotted lines at G in Figure 5. Thus the cutting edges of maximum axial width which are required to make the heaviest cut into the work are acute, whereas the succeeding cutting edges which are required to make smaller cuts, are less acute, and, in fact, ultimately become obtuse. This structural arrangement provides a tapping screw in which the tapping or entering portion of the thread is provided with cutting edges, which at the entering end are acute and which gradually change in angularity until they become obtuse at a point spaced from the entering end and at a point where less material is removed from the work. These obtuse cutting edges 34 of smaller width serve to finish the bottom of the thread where a narrow cut is taken. In other words, the initial heavy duty cutting takes place where the thread is the widest and the finishing cut through the agency of an obtuse cutting edge takes place where the thread is the narrowest. Stating it in another way, the rake at the front of the cutting edges is more pronounced in the stronger structure, namely, the thread of wider cross section and less height, the rake becoming less as the tooth presented by the cut-away thread becomes weaker, or, in other words, narrower, a negative rake presenting itself at said narrow tooth or thread.

Figure 13:
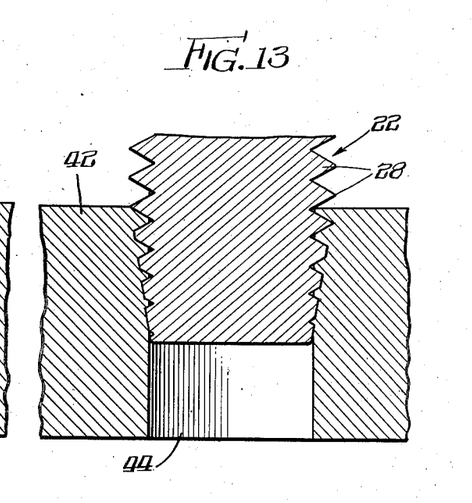
Figure 13 is similar to Figure 12, but shows an advanced position of the screw within the work piece.

Referring to Figure 4, it will be noted that because of the curvature of the wall or surface 36, some of the threads spaced from the entering end of the screw are provided with leading sides or edges which are obtuse, and trailing sides which are acute. Thus, in Figure 4 a leading side or edge J is obtuse, whereas the complementary trailing edge K is acute. The screw is initially applied to the aperture 44, as indicated in Figure 12, the aperture 44 having a diameter slightly larger than the root or core diameter of the screw. The first thread convolution enters the aperture 44 without making any appreciable cut into the work, whereas the succeeding convolutions cut their way into the work, and when the screw has been partially turned into the work, it will appear as shown in Figure 13.

Figures 14, 15, 16:
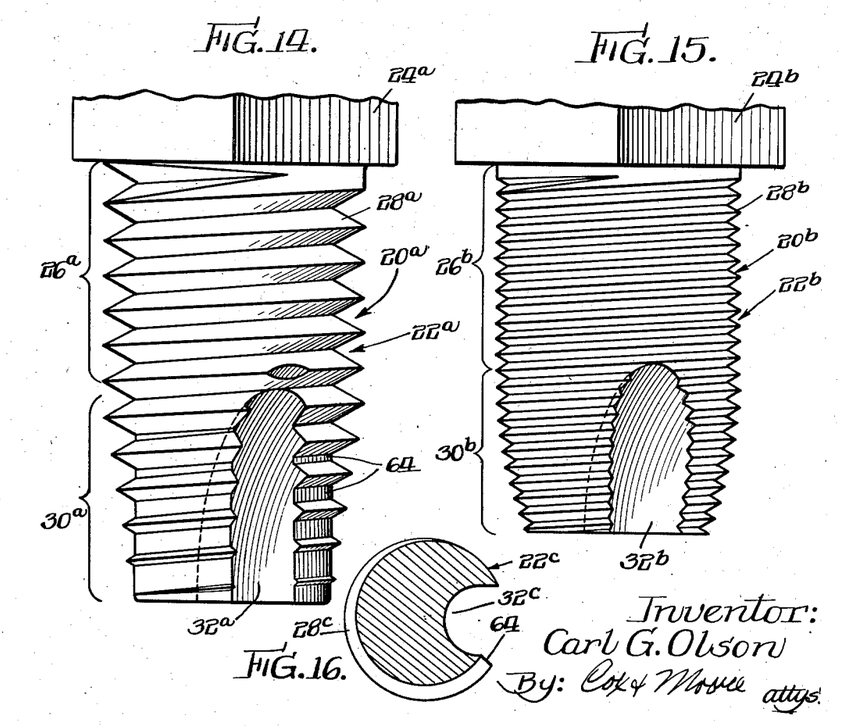
Figure 14 is a modified cutting device or fastener contemplated by the present invention.
Figure 15 represents a further modified structure of a screw which is constructed and arranged in accordance with the teachings of the present invention.
Figure 16 is a section (similar to that shown in Figure 7) of a screw in which the trailing extremities of the convolutions of the tapping section are chamfered or relieved to counteract the tendency of chipping which might result from pressure developed at that location.

In Figure 14 I have disclosed a modified tapping device or fastener indicated generally by the numeral 20a. This fastener 20a includes a threaded body indicated generally by the numeral 22a, which body comprises a holding section 26a forming continuous thread convolutions of uniform height and an entering or tapping section 30a, in which the thread convolutions maintain their V-shaped cross section at the crown, but diminish in height with respect to the core or root diameter. The axial pitch of the thread 28a of the screw 20a remains constant, and the full thread on the section 26a helically continues in decreasing height or diameter within the section 30a, the thread convolutions on the section 30a, in effect, becoming partially buried within the core of the screw. It will be noted that the core of the screw becomes exposed in the form of a peripheral surface 64, which gradually increases in axial width toward the entering end of the screw, the thread terminating at the entering end of the exposed core. The thread convolutions on the section 30a decrease in height toward the entering end in proportion to the increase in axial width of the helical surface 64. Likewise, the base of each thread convolution on the section 30a decreases in width proportionately to the decrease in the height of the thread and the increase in the width of the helical surface 64. The screw is provided with a recess 32a which is identical with the recess 32 previously described. The cutting edges presented by the recess 32a are V-shaped in cross section, as distinguished from the edges 34 previously described. Furthermore, this V-shape is uniform, the only difference being that a gradually increasing V is presented as the thread approaches the full and complete thread on the section 26a. The surface which determines the recess 32a conforms structurally with the surfaces 36 and 36a previously described, and functions similarly in laterally and axially directing the cut-away material so as to maintain a clear path through the recess. The screw 20a is also provided with a head 24a.

In Figure 15 a further modified screw construction designated generally by the numeral 22b, is disclosed. The screw 22b includes a threaded body 20b comprised of a holding section 26b and a tapering tapping portion 30b. The thread 28b is uniform in height throughout the extent of the screw and is uniform in diameter along the section 26b. The diameter of the thread gradually decreases toward the entering end along the section 30b to facilitate its entrance within an unthreaded aperture of a work piece. The thread 28b maintains its V-shaped crown uniform throughout the extent of the screw body, and distinguishes from the screw of Figure 14 in having a thread of constant or uniform height extending along the tapping section 30b. The axial pitch of the thread 28b remains constant over the holding and tapping sections thereof. A suitable recess 32b conforming structurally and functionally with the recesses 32 and 32a previously described is also provided. The recess 32b presents a serrated cutting edge, which effectively functions to cut away material in the form of substantial shavings or strips from a work piece. The screw 22b is also provided with a suitable head 24b.

In Figure 16 I have shown a slightly modified screw structure 22c having a thread 28c, said screw being similar in every respect to the screw of Figure 7, except for the provision of a chamfer 64 at the trailing extremities of the thread convolutions on the tapping section. By providing the chamfered or recessed portion 64, the angle included between the thread periphery and the wall of the recess 32c is rendered less acute. Thus, when pressure is developed at the trailing side of the convolutions in the manner previously described, the tendency for this pressure to cause the thread in this vicinity to chip off is materially reduced.

From the foregoing it will be apparent that my invention contemplates a tapping device or tapping fastener which is particularly adapted for use in heavy gauge material, as distinguished from relatively thin sheet stock. In tapping material having any appreciable thickness, considerable stock is removed during the tapping operation, and my invention enables this stock not only to be expeditiously cut but rapidly removed from the vicinity of the cutting edge. I prefer to employ threads conforming with standard machine screw specifications. Such threads not only present effective cutting edges, but also provide a firm anchorage in the work. Furthermore, by employing the standard machine screw thread, the fasteners may be replaced by standard bolts or screws, if necessary. It will also be apparent that the invention contemplates a threaded tapping device in which the compressive force exerted by the succeeding thread convolutions is employed to render the cutting edges more aggressive or effective in removing material from the work piece. Obviously a recess constructed in accordance with the teachings of my invention must be of sufficient size to accommodate the cut-away material, and yet so disposed and of such cross section as to enable the compressive force of each receding thread convolution to be rendered functionally operable in expediting the removal of material by the cutting edge. While I have in the present application, for purposes of illustration, disclosed one embodiment of the recess and the deflecting surface which defines said recess, it will be understood that the invention is not limited to this specific form, but contemplates other modifications which are designed and function in accordance with the theory of operation set forth herein. The embodiment of my invention, as disclosed in Figures 1 to 13, inclusive, employs a tapering thread arrangement wherein the thread is of the type having a flat top. In this construction the cutting edge along the crest of the entering thread convolution is wider than the succeeding cutting edges, the decrease in said width being in proportion to the increase in the diameter of the thread until the full thread on the holding portion of the screw is reached. Furthermore, the cutting edge at the entering end is more acute than the cutting edge at a point removed from the screw extremity, thereby presenting the greatest acuteness where it is most needed, namely, at the point where the largest cut is made in the work. Conversely, as the crown or crest of the thread diminishes in width or becomes more delicate, the cutting edge becomes less acute, and, in fact, reaches a point where it becomes obtuse, thus compensating for this more delicate thread structure and causing a finishing action, as distinguished from an aggresive cutting action to take place.

The crown or crest of the tapping devices disclosed in Figures 14 and 15 maintain a uniform V-shaped cross section, the thread on the tapping section in the screw of Figure 14 decreasing in height with respect to the core of the screw, whereas the the thread on the tapping portion of the screw in Figure 15, while it diminishes in diameter, maintains the height thereof uniform.

It will also be apparent from the foregoing description that the cutting edge and associated recess of my improved screw are so disposed as to enable the production of curls or coils of stock within the recess, which coils progress axially of the screw toward the entering end thereof. In this connection it should be understood that the surface which defines the recess is of such a warped or irregular shape that, when the strip material impinges this surface, it is not only initially guided laterally and axially of the screw, but is actually shaped into a coil as a result of the engagement with the surface. This shaping of the work into the coil or curl renders the strip self-operable when its movement is axial of the screw. Once the strip material has been shaped or formed into the curl or coil by the warped guiding surface, it directs itself through the recess to the point of exit. Obviously there must be an initial force to impart the turning or coiling movement, and this is established by the force of the strip material emerging from the cutting edge and impinging the inclined or warped guiding surface within the recess. Thus, the surface 36 serves not only as a directing or guiding means, but also as means for imparting to the cut-away material a shape or form which renders the material self-ejecting. This self-ejecting action is particularly noticeable in cutting away material, such as metal which is sufficiently ductile to shape itself in response to the forming action of the deflecting surface. The cross sectional area of the recess increases quite rapidly toward the entering end of the screw, and this materially facilitates the positive egress of the work. As clearly shown in the drawings, the circumferentially exposed portion of the recess diminishes in width as said recess extends away from the entering end of the screw. Thus, the oppositely disposed side walls of the recess, which in the disclosed embodiment are substantially parallel, incline toward each other at a point spaced from the entering end of the screw. In fact, the guiding or deflecting surface 36 partakes of a double inclination, one inclination serving to urge the advancing strip laterally into the form of a spiral, and the other inclination serving to impart to the spiral the tendency to become helical and move axially toward the entering end of the screw.

It will also be apparent from the foregoing description that my invention contemplates the provision of new and improved methods of cutting threads in relatively hard work, such as heavy gauge metals. I contemplate practicing the method of cutting thread in such material, which includes the step of engaging an inner periphery of an unthreaded aperture in the work with a cutting edge, moving the cutting edge along a helical path, simultaneously causing the material in advance of the cutting edge to rise as a result of relieving the compressed work, said rise being sufficient to render the cutting action of the edge more aggressive so as to remove substantial strip or coiled stock, and then directing said cut-away material from the cutting edge as rapidly as said edge produces it, and thereby enable the continuous helical travel of the cutting edge through the work.

In the drawings I have shown a single work piece 42. This is the work piece into which the screw or fastener is inserted to cut threads or tap. Obviously my invention contemplates the adaptation of the screw of the present invention to the conventional uses to which tapping screws are now employed in the field. In other words, my improved screw fastener is adapted to secure two work pieces together. Thus, if the screw is to be used to hold a part (not shown) to the work piece 42, it is only necessary to provide an aperture in such a part through which the screw may freely pass, the head 24 then serving to clamp the part against the work piece 42. Obviously the invention is not limited to any particular use of the screw, and hence, for purposes of clearness, I have shown only the heavy gauge material or work in which the screw cuts its way.

Throughout the foregoing description I have referred to the cutting edges 34. In the appended claims I employ the term "cutting edge", and this obviously includes the cutting edges 34, etc., in the aggregate. That is, the plurality of cutting edges presented by the series of cut-away thread portions, in the aggregate, present a "cutting edge" on the tapping device or screw.

Obviously the invention is not limited to the thread construction disclosed herein, but contemplates other shapes and forms which come within the scope of the appended claims.

Having thus described my invention, what I claim as new and desire to secure by Letters Patent is:

1. A tapping screw including a body having a threaded holding portion and a hardened threaded tapping portion at one extremity thereof, the thread on the tapping portion being circumferentially unrelieved and decreasing in external diameter toward the entering end to facilitate its initial application to an unthreaded aperture in a work piece, thread convolutions on said tapping portion presenting peripheral V-shaped ridges, a recess traversing said thread convolutions on said tapping portion to present a serrated cutting edge, said recess being of sufficient cross section to accommodate material removed by said cutting edge when the screw is continuously turned in a work piece, thread sections on said tapping portion receding from said cutting edge being sufficiently rigid to exert a compressive force when turned within the work piece, whereby to cause material of the work piece to be more aggressively presented to said cutting edge, and said recess including means for deflecting cut-away material entering said recess to a point externally of the recess, whereby to enable the continuous rotation of the screw during the tapping operation.

2. A tapping screw including a body having a threaded holding portion and a hardened threaded tapping portion at one extremity thereof, the thread on the tapping portion decreasing in external diameter toward the entering end to facilitate its initial application to an unthreaded aperture in a work piece, a single recess traversing thread convolutions on said tapping portion to present a cutting edge, said recess being of sufficient cross section to accommodate material removed by said cutting edge when the screw is continuously turned in a work piece, and means for receiving cut-away material entering said recess and for spirally and axially directing said material to a point externally of the recess as rapidly as said material is cut away to thereby enable the continuous rotation of the screw during the tapping operation.

3. A tapping screw including a body having a threaded holding portion and a hardened threaded tapping portion at one extremity thereof, the thread on the tapping portion being circumferentially unrelieved and decreasing in external diameter toward the entering end to facilitate its initial application to an unthreaded aperture in a work piece, thread convolutions on said tapping portion presenting peripheral V-shaped ridges, a recess traversing said thread convolutions on said tapping portion to present a serrated cutting edge, said recess being of sufficient cross section to accommodate material removed by said cutting edge when the screw is continuously turned in a work piece, thread sections on said tapping portion receding from said cutting edge being sufficiently rigid to exert a compressive force when turned within the work piece, said recess being so disposed as to provide relief for the compressed material by permitting the inward expansion thereof in advance of said cutting edge during the rotation of the screw, and said recess including means for deflecting cut-away material entering said recess to a point externally of the recess, whereby to enable the continuous rotation of the screw during the tapping operation.

4. A tapping screw including a body having a threaded holding portion and a hardened threaded tapping portion at one extremity thereof, the thread on the tapping portion being circumferentially unrelieved and decreasing in external diameter toward the entering end to facilitate its initial application to an unthreaded aperture in a work piece, the cross sectional shape of the crest of said thread being uniform on said holding and tapping portions, a recess traversing thread convolutions on said tapping portion to present a cutting edge, said recess being of sufficient cross section to accommodate material removed by said cutting edge when the screw is continuously turned in a work piece, thread sections on said tapping portion receding from said cutting edge being sufficiently rigid to exert a compressive force when turned within the work piece, whereby to cause material of the work piece to be more aggressively presented to said cutting edge, and said recess including means for deflecting cut-away material entering said recess to a point externally of the recess, whereby to enable the continuous rotation of the screw during the tapping operation.

5. A tapping screw including a body having a threaded holding portion and a hardened threaded tapping portion at one extremity thereof, said thread being V-shaped in cross section and extending outwardly from a core of uniform diameter, the thread on the tapping portion being circumferentially unrelieved and decreasing in height with respect to said core toward the entering end to facilitate its initial application to an unthreaded aperture in a work piece, a recess traversing thread convolutions on said tapping portion to present a cutting edge, said recess being of sufficient cross section to accommodate material removed by said cutting edge when the screw is continuously turned in a work piece, thread sections on said tapping portion receding from said cutting edge being sufficiently rigid to exert a compressive force when turned within the work piece, whereby to cause material of the work piece to be more aggressively presented to said cutting edge, and said recess including means for deflecting cut-away material entering said recess to a point externally of the recess, whereby to enable the continuous rotation of the screw during the tapping operation.

6. A tapping screw including a body having a threaded holding portion and a hardened threaded tapping portion at one extremity thereof, the thread on the tapping portion being circumferentially unrelieved and decreasing in external diameter toward the entering end to facilitate its initial application to an unthreaded aperture in a work piece, the thread on said tapping portion being uniform in height and crown cross section, a recess traversing thread convolutions on said tapping portion to present a cutting edge, said recess being of sufficient cross section to accommodate material removed by said cutting edge when the screw is continuously turned in a work piece, thread sections on said tapping portion receding from said cutting edge being sufficiently rigid to exert a compressive force when turned within the work piece, whereby to cause material of the work piece to be more aggressively presented to said cutting edge, and said recess including means for deflecting cut-away material entering said recess to a point externally of the recess, whereby to enable the continuous rotation of the screw during the tapping operation.

7. A tapping screw including a body having a threaded holding portion and a hardened threaded tapping portion at one extremity thereof, the thread on the tapping portion decreasing in external diameter toward the entering end to facilitate the initial application to an unthreaded aperture in a work piece, a recess traversing thread convolutions on said tapping portion to present a cutting edge, the effective portion of which terminates short of the screw head, the portion of the cutting edge at the entering end of the screw being acute and the portion of said cutting edge spaced from the screw extremity being obtuse, said recess being symmetrical in transverse cross section and being of sufficient cross section to accommodate material removed by said cutting edge when the screw is continuously turned in a work piece, and said recess including means for receiving cut-away material entering said recess and for axially directing said material to a point externally of the recess as rapidly as said material is cut away to thereby enable the continuous rotation of the screw during the tapping operation.

8. A tapping screw including a body having a threaded holding portion and a hardened threaded tapping portion at one extremity thereof, the thread on the tapping portion being circumferentially unrelieved and decreasing in external diameter toward the entering end to facilitate its initial application to an unthreaded aperture in a work piece, a recess traversing thread convolutions on said tapping portion to present a cutting edge, said recess being of sufficient cross section to accommodate material removed by said cutting edge when the screw is continuously turned in a work piece, thread sections on said tapping portion receding from said cutting edge being sufficiently rigid to exert a compressive force when turned within the work piece, whereby to cause material of the work piece to be more aggressively presented to said cutting edge, said receding thread sections having obtuse trailing extremities to counteract the tendency to chip as a result of the pressure experienced in that vicinity when the screw is turned in the work piece, and said recess including means for deflecting cut-away material entering said recess to a point externally of the recess, whereby to enable the continuous rotation of the screw during the tapping operation.

9. A thread cutting screw fastener including a body having a threaded holding portion of uniform diameter and a hardened thread cutting portion at one extremity thereof, a head at the opposite extremity of the body, the thread along the holding and thread cutting portions being V-shaped in cross section, the thread on the thread cutting portion decreasing in external diameter toward the entering end to facilitate its initial application to an unthreaded aperture in a work piece and transversely recessed so as to provide a serrated cutting edge, the sections of the thread convolutions along the recess opposite from said cutting edge being relatively rigid, the thread along the thread cutting portion being of constant height.

10. A thread cutting screw fastener including a body having a threaded holding portion and a hardened thread cutting portion at one extremity thereof, a head at the opposite extremity of said body, the crown of the thread along the holding and thread cutting portions being of uniform cross sectional contour and extending from the vicinity of the head toward the entering end of the fastener, the axial pitch of said thread being uniform and gradually decreasing in crest diameter toward the entering end to facilitate its initial application to an unthreaded aperture in a work piece, exposed peripheral core surfaces extending between thread convolutions on said thread cutting portion, said thread cutting portion being longitudinally recessed so as to provide a serrated cutting edge at said recess, the thread sections on said thread cutting portion along the recess opposite from said cutting edge being relatively rigid.

11. A thread cutting screw fastener including a body having a threaded holding portion and a hardened thread cutting portion at one extremity thereof, a head at the opposite extremity of said body, the crown of the thread along the holding and thread cutting portions being of uniform cross sectional contour and extending from the vicinity of the head toward the entering end of the fastener, the axial pitch of said thread being uniform and gradually decreasing in crest diameter and height towards the entering end to facilitate its initial application to an unthreaded aperture in a work piece, exposed peripheral core surfaces extending between thread convolutions on said thread cutting portion, said thread cutting portion being longtudinally recessed so as to provide a serrated cutting edge at said recess, the thread sections on said thread cutting portion along the recess opposite from said cutting edge being relatively rigid.

12. A tapping screw fastener including an elongated body having a threaded holding portion and a hardened non-burrowing threaded tapping portion at one extremity thereof, and a head connected with the opposite extremity of said body, the thread along the holding and tapping portions being V-shaped in cross section and extending from the vicinity of the head to the entering end of the fastener, the thread on the tapping portion decreasing in external diameter and height toward the entering end to facilitate its initial application to an unthreaded aperture in a work piece and transversely recessed so as to present a serrated cutting edge, the effective portion of said cutting edge terminating short of the head, and the sections of the thread convolutions along the recess opposite from the cutting edge being relatively rigid.

13. A tapping screw fastener including an elongated body having a threaded holding portion and a hardened non-burrowing threaded tapping portion at one extremity thereof, and a head connected with the opposite extremity of said body, the thread extending from the vicinity of the head to the entering end of the fastener, the thread on the tapping portion decreasing in external diameter and height toward the entering end to facilitate its initial application to an unthreaded aperture in a work piece and transversely recessed so as to present a serrated cutting edge, the effective portion of said cutting edge terminating short of the head, the crown of the thread being substantially uniform in cross sectional contour, and the sections of the thread convolutions along the recess opposite from the cutting edge being relatively rigid.

14. A tapping screw fastener including an elongated body having a threaded holding portion and a hardened non-burrowing threaded tapping portion at one extremity thereof, and a head connected with the opposite extremity of said body, the thread along the holding and tapping portions being V-shaped in cross section and extending from the vicinity of the head to the entering end of the fastener, the thread on the tapping portion decreasing in external diameter toward the entering end to facilitate its initial application to an unthreaded aperture in a work piece and transversely recessed so as to present a serrated cutting edge, the root diameter of the thread toward the entering end being at least as great as the root diameter of the thread on the holding portion, the effective portion of said cutting edge terminating short of the head, and the sections of the thread convolutions along the recess opposite from the cutting edge being relatively rigid.

15. A tapping screw fastener including an elongated body having a threaded holding portion and a hardened non-burrowing threaded tapping portion at one extremity thereof, and a head connected with the opposite extremity of said body, the thread extending from the vicinity of the head to the entering end of the fastener, the thread on the tapping portion decreasing in external diameter toward the entering end to facilitate its initial application to an unthreaded aperture in a work piece and transversely recessed so as to present a serrated cutting edge, the effective portion of said cutting edge terminating short of the head, the crown of the thread being substantially uniform in cross sectional contour, the sections of the thread convolutions along the recess opposite from the cutting edge being relatively rigid, and exposed peripheral core surfaces of varying axial widths extending between thread convolutions on said tapping portion.

16. A tapping screw fastener including a body having a threaded holding portion and a hardened threaded tapping portion at one extremity thereof, a head connected at the opposite extremity of said body, said tapping portion being longitudinally recessed to present a cutting edge, the effective portion of said cutting edge terminating short of the head, the crown of the thread along the holding and tapping portions being of uniform cross sectional contour and extending from the vicinity of the head toward the entering end of the fastener, the axial pitch of said thread being uniform, the thread on the tapping portion gradually decreasing in crest diameter toward the entering end to facilitate its initial application to an unthreaded aperture in a work piece, and exposed peripheral core surfaces of varying axial widths extending between thread convolutions on said tapping portion, and the sections of the thread convolutions along the recess opposite from the cutting edge being relatively rigid.

CARL G. OLSON.